US011879063B2

(12) United States Patent
Hampson et al.

(10) Patent No.: US 11,879,063 B2
(45) Date of Patent: Jan. 23, 2024

(54) BINDER COMPOSITIONS AND USES THEREOF

(71) Applicants: KNAUF INSULATION SPRL, Visé (BE); KNAUF INSULATION, INC., Shelbyville, IN (US)

(72) Inventors: Carl Hampson, Liverpool (GB); Ferdous Khan, St. Helens (GB)

(*) Notice: Subject to any disclaimer, the term of this patent is extended or adjusted under 35 U.S.C. 154(b) by 324 days.

(21) Appl. No.: 17/214,902

(22) Filed: Mar. 28, 2021

(65) Prior Publication Data

US 2021/0214557 A1 Jul. 15, 2021

Related U.S. Application Data

(63) Continuation-in-part of application No. 17/115,732, filed on Dec. 8, 2020, now abandoned, which is a continuation of application No. 17/036,434, filed on Sep. 29, 2020, now abandoned, which is a continuation of application No. 16/932,722, filed on Jul. 18, 2020, now abandoned, which is a continuation of application No. 16/870,963, filed on May 9, 2020, now abandoned, which is a continuation of application No. 16/798,313, filed on Feb. 22, 2020, now abandoned, which is a continuation of application No. 16/699,516, filed on Nov. 29, 2019, now abandoned, which is a continuation of application No. 16/512,804, filed on Jul. 16, 2019, now abandoned, which is a continuation of application No. 16/038,647, filed on Jul. 18, 2018, now abandoned, which is a continuation of application No. 15/326,520, filed as application No. PCT/EP2015/066437 on Jul. 17, 2015, now Pat. No. 10,035,913.

(30) Foreign Application Priority Data

Jul. 17, 2014 (GB) .................................... 1412706

(51) Int. Cl.
| | | |
|---|---|---|
| C08L 97/00 | (2006.01) | |
| C08L 97/02 | (2006.01) | |
| C08L 5/08 | (2006.01) | |
| C09J 197/00 | (2006.01) | |
| B27N 3/00 | (2006.01) | |
| C09D 197/00 | (2006.01) | |

(52) U.S. Cl.
CPC .............. *C08L 97/00* (2013.01); *B27N 3/002* (2013.01); *C08L 5/08* (2013.01); *C08L 97/02* (2013.01); *C09D 197/00* (2013.01); *C09J 197/005* (2013.01); *C08L 2201/54* (2013.01)

(58) Field of Classification Search
CPC .. C08L 97/00; C08L 97/02; C08L 5/08; C08L 2201/54; B27N 3/002; C09D 197/00; C09J 197/005
USPC .......................................................... 524/13
See application file for complete search history.

(56) References Cited

U.S. PATENT DOCUMENTS

| | | | | |
|---|---|---|---|---|
| 2,849,314 A | | 8/1858 | Goss | |
| 4,130,515 A | | 12/1978 | Bornstein | |
| 4,177,313 A | * | 12/1979 | Herault | ............... C03C 25/1095 |
| | | | | 156/335 |
| 4,981,944 A | * | 1/1991 | Bartels | ...................... C08F 8/46 |
| | | | | 525/445 |
| 2010/0301256 A1 | * | 12/2010 | Hampson | .................. C08H 8/00 |
| | | | | 106/501.1 |
| 2014/0094562 A1 | * | 4/2014 | Hagiopol | ................ C08L 33/00 |
| | | | | 525/472 |

FOREIGN PATENT DOCUMENTS

WO 2014086775 6/2014

OTHER PUBLICATIONS

International Preliminary Report on Patentability for PCT/EP2015/066437 (6 pages; dated Jan. 17, 2017).
Office Action for U.S. Appl. No. 15/326,520 (6 pages)—dated Oct. 30, 2017.

\* cited by examiner

*Primary Examiner* — Hui H Chin
(74) *Attorney, Agent, or Firm* — Knauf Insulation, Inc.; James K. Blodgett (57) ABSTRACT

The present invention relates to a new aqueous curable binder composition comprising a polyphenolic macromolecular compound which bears a multitude of catechol radicals (dihydroxybenzene), preferably lignosulfonate salts and condensed tannins and mixtures thereof, and a polyamine functional compound comprising primary and/or secondary and/or tertiary and/or quaternary amine functional groups, suitable for bonding particulate matter, such as fibers, more particularly mineral wool fibers, or particles, such as wood particles.

16 Claims, 6 Drawing Sheets

BINDER COMPOSITIONS AND USES THEREOF

CROSS-REFERENCE TO RELATED APPLICATIONS

This application is a continuation-in-part of U.S. application Ser. No. 17/115,732, filed Dec. 8, 2020, which is a continuation of U.S. application Ser. No. 17/036,434, filed Sep. 29, 2020, which is a continuation of U.S. application Ser. No. 16/932,722, filed Jul. 18, 2020, which is a continuation of U.S. application Ser. No. 16/870,963 (now abandoned), filed May 9, 2020, which is a continuation of U.S. application Ser. No. 16/798,313 (now abandoned), filed Feb. 22, 2020, which is a continuation of U.S. application Ser. No. 16/699,516 (now abandoned), filed Nov. 29, 2019, which is a continuation of U.S. application Ser. No. 16/512,804 (now abandoned), filed Jul. 16, 2019, which is a continuation of U.S. application Ser. No. 16/038,647 (now abandoned), filed Jul. 18, 2018, which is a continuation of U.S. application Ser. No. 15/326,520 (now U.S. Pat. No. 10,035,913), filed Jan. 16, 2017, which is a U.S. national counterpart application of International Application Serial No. PCT/EP2015/066437, filed Jul. 17, 2015, under 35 U.S.C. § 371, which claims priority to GB Application Serial No. 1412706.2, filed Jul. 17, 2014, the disclosures of which are hereby incorporated herein by reference.

FIELD OF THE INVENTION

The present invention relates to binder compositions, more specifically curable binder compositions for use in manufacturing products from a collection of non or loosely assembled matter. For example, these binder compositions may be employed to fabricate fiber products which may be made from woven or nonwoven fibers. In one illustrative embodiment, the binder compositions are used to bind glass fibers to make fiberglass. In another illustrative embodiment, the binder compositions are used to bind mineral wool fibers, such as glass wool or stone wool in a matted layer, such as an insulating product. In a further embodiment, the binders are used to make cellulosic compositions. With respect to cellulosic compositions, the binders may be used to bind cellulosic matter to fabricate, for example, wood fiber board or particle board which has desirable physical properties (e.g., mechanical strength). The invention further extends to a product made from loosely assembled matter bound by a binder of the invention.

BACKGROUND

Known thermosetting binders comprise a variety of phenol-aldehyde, urea-aldehyde, melamine-aldehyde, and other condensation-polymerization materials such as furane and polyurethane resins. Aldehyde based binders and more particularly formaldehyde based or generating binders are widely used.

Alternative formaldehyde-free binder compositions include polyester-based binders obtained by the reaction of a polycarboxylic acid polymer and a polyol that form a thermoset when heat cured. More recently, formaldehyde free binders have been made from sustainable materials, such as from the condensation of amine groups containing compounds with reducing sugars as thermosets. These alternative chemistries show advantages as compared to prior formaldehyde based technology, but also show certain weaknesses, and there is still a need for alternative binder chemistry. Some of these known binder chemistries show a relatively high loss of water in the condensation reaction, which may have a negative impact on the internal bond strength and/or swelling properties of products.

A. Faure et al disclose in their review article "Catechols as versatile platforms in polymer chemistry" published in Progress in Polymer Science 38 (2013), 236-270, that catechol units containing compounds show strong adhesion to a large range of surfaces, even under wet conditions. The authors review methods to incorporate catechol units in complex functionalized macromolecules.

SUMMARY

The present invention seeks to provide binders which generate or promote cohesion and are capable of holding a collection of matter together such that the matter adheres in a manner to resist separation. An objective of the present invention is to provide binders showing high bond strength.

Another objective of the present invention is to provide cost-effective binder compositions for large volume applications.

Another objective is to provide a binder composition based on renewable and/or sustainable resources.

Further, the invention seeks to provide binder compositions that rapidly cure into strong binders.

Yet another purpose of the invention is to provide an assembly of matter bonded with the invention binder.

DETAILED DESCRIPTION

Lignin is a constituent of woody plants, composed of a complex group of phenolic polymers that provide strength and rigidity to woody cell walls of various plants. The lignin molecule is complex and not yet fully understood. Lignosulfonates are derived from lignin by sulfonation, for instance in a wood pulping process, more specifically with salts of bisulfite/sulfite. The sulfonate complex may be in association with calcium, magnesium, ammonium, or sodium. Lignin and its derivatives have several advantages, such as renewability, biodegradability, low cost and available supply. Lignosulfonates are used in the concrete industry as dispersing agents and to delay the setting of concrete. They may be used as additives in oil well drilling, dispersants for dyestuffs, cleaning agents, and as a partial substitute for phenol in the manufacture of adhesives. Sodium lignosulfonate is potentially useful in inhibiting corrosion and scale formation in recirculating cooling water systems. In some applications, lignosulfonate salts are reacted with certain amines to form dyes (see for instance U.S. Pat. No. 5,989,299) or dispersants. U.S. Pat. No. 4,130,515 discloses a lignin-based resin binder produced by copolymerization of a lignosulfonate salt with melamine and formaldehyde.

The present invention now provides an aqueous curable binder composition comprising a polyphenolic macromolecular compound and a polyamine functional compound and/or a reaction product thereof, in accordance with the claims. The term polyphenolic macromolecular compound as used herein designates a macromolecular compound, preferably an essentially natural macromolecular compound or a macromolecular compound derived from a natural macromolecular compound, which bears a multitude of phenol or polyhydroxybenzene radicals, such as catechol radicals (dihydroxybenzene). Examples of such polyphenolic macromolecular compounds are lignosulfonate salts and condensed tannins and mixtures thereof.

Lignosulfonate salts may advantageously be selected from calcium lignosulfonate, sodium lignosulfonate, ammonium lignosulfonate, magnesium lignosulfonate and mixtures thereof.

Tannins are commonly found in plants. Compounds of interest in accordance with the invention comprise polyphenolic macromolecular compounds, hence may be essentially condensed tannins.

According to the present invention, the polyamine functional compound comprises primary and/or secondary and/or tertiary and/or quaternary amine functional groups and may be selected from diamines, triamines, tetramines, pentamines and polymeric plolyamines or polyimines. Examples are hexamethylenediamine, diethylenetetramine, diethylenetriamine, polyethyleneimine (PEI), polyvinyl amine, polyether amine, polylysine, ethylene diamine, 1,3-diaminopropane, cadaverine, spermidine, spermine, putrescine, tetraethylmethylenediamine, and triethylenetetramine. As is known to the skilled person, several different types of polyethylenimines are available, such as linear polyethylenimines, branched polyethylenimines and dendrimer type polyethylenimine. Similarly, polyetheramines may show a linear form and branched forms, and all are believed to be suitable for the generation of binder compositions and, hence, binders of the invention.

It is understood by the skilled person that the term "polyamine functional compound" encompasses peptides and proteins. Hence, according to the invention, the polyamine functional compound may comprise peptides and/or proteins, in their natural or denatured state, possibly in the form of a hydrocolloid such as gelatine.

The ratio of polyphenolic macromolecular compound to polyamine functional compound ranges from 98:2 to 70:30 w %, preferably from 95:5 to 80:20 w %.

Preferably, the ratio of reactive groups on the macromolecules to reactive amino groups in the amine components may be in the range of 10:1 to 1:1.

Preferred binder compositions comprise a lignosulfonate salt, preferably ammonium lignosulfonate or calcium or magnesium lignosulfonate, and a diamine, such as hexamethylenediamine (HMDA).

Preferably such binder compositions further comprise a matrix polymer, such as polymers of natural and/or synthetic origin. These polymers may act as an active filling agent in the binder formulation, and may form intra- and intermolecular chain interactions. Naturally derived polymers may advantageously be selected from cellulose and its derivatives, such as cellulose ether and ester derivatives. The cellulose ether derivatives can be prepared by carboxymethylation, carboxyethylation and carboxypropylation. Examples of preferred cellulose ether derivatives are: carboxymethyl cellulose (CMC), sodium carboxymethyl cellulose (NaCMC), hydroxypropyl cellulose (HPC), hydroxyethyl cellulose (HEC), hydroxypropylmethyl cellulose (HPMC), methyl cellulose (MC), ethyl cellulose (EC), trityl cellulose, and so on. The cellulose ester derivatives can be prepared by esterification of cellulose. The ester derivatives include acetates, butyrates, benzoates, phthalates and anthranilic acid esters of cellulose, preferably cellulose acetate phthalate (CAP), cellulose acetate butyrate (CAB), cellulose acetate trimelitate (CAT), hydroxylpropylmethyl cellulose phthalate (HPMCP), succinoyl cellulose, cellulose fuoroate, cellulose carbanilate, and mixture thereof. In some binder compositions cationic cellulose derivatives may be used. Some binder compositions may comprise other polysaccharides such as alginates, starch, chitin and chitosan, agarose, hyaluronic acid, and their derivatives or copolymers (e.g., graft-copolymer, block copolymer, random copolymers), or mixtures thereof.

Synthetically derived polymers may include polyacrylates, polymethacrylates, polyacrylamides, polymethacrylamides, polyurethanes, polyesters, polyvinyls and/or their copolymers, and aliphatic isocyanate oligomers, compounds containing one or more azetidinium group, or mixtures thereof.

In one embodiment the binder formulation may comprise polyacrylate, polymethacrylate or polyacrylamide or mixtures thereof, which may be formed from polymerisation of one or more, typically two or three, monomers, which may be present in differing amounts. Preferably the one of the monomers is a substituted alkyl methacrylate or acrylate monomer. The alkyl group of the substituted alkyl function may have from 1 to 10, preferably 1 to 4 carbon atoms and the substituent group may be an alkoxy group with 1 to 4 carbon atoms, such as a methoxy group, or a dialkylamino group, such as dimethylamino. Particularly preferred acrylate monomers are: 2-methoxyacrylate (MEA), 3,5,5-trimethylhexyl acrylate (TMHA), ethylene glycol acrylate (EGA), 2-ethoxyethyl acrylate (EOEA), ethylene glycol diacrylate (EGDA), ethyl 2-ethylacrylate (EEA), (ethylcyano)acrylate (ECA), ethyl 2-propyl acrylate (EPA), ethyl 2-(trimethylsilylmethyl)acrylate (ETMSMA), butyl acrylate (BA), butylcyclohexyl acrylate (BCHA), benzyl 2-propyl acrylate (BPA), carboxyethyl acrylate (CEA), 2-(diethylamino)ethyl acrylate (DEAEA), 2-(diethylamino)propyl acrylate (DEAPA). The examples of preferred metharcylate monomers are: methylmethacrylate (MMA), 2-hydroxyethyl methacrylate (HEMA), 2-methoxymethacrylate (MEMA), 2-(diethylamino) ethyl methacrylate (DEAEMA), 2-aminoethyl methacrylate (AEMA), benzyl methacrylate (BMA), 2-butoxyethyl methacrylate (BEMA), 2-(tert-butylamino)ethyl methacrylate (TBAEMA), cyclohexyl methacrylate (CHMA), ethylene glycol methacrylate (EGMA), 2-(diisopropylamino)ethyl methacrylate (DIPAEMA). Preferred acrylamide/methacrylamide monomers are: alkylacrylamide (AAAm), butylacrylamide (BAAm), diethylacrylamide(DEAAm), N,N-dimethyl acrylamide (DMAAm), ethylacrylamide (EAAm), hydroxyethyl acrylamide (HEAAm), hydroxymethyl acrylamide (HMAAm), N-isopropyl acrylamide (NIPAAm), N,N-diethylmethacrylamide (DEMAAm), N-diphenyl methacrylamide (DPMAAm). Preferred polymers comprise two or more monomers and typically a mixture of MEMA or MEA, and DEAEMA, in a weight ratio of 30:70 to 80:20. Preferred ratios of MEMA or MEA to DEAEMA are 70:30 and more preferably 55:45 or 50:50. Optionally further monomers may be present, such as acrylic acid (AA) or methacrylic acid (MAA) in a weight ratio of 1 to 10 percent, preferably about 5 percent by weight. A suitable polymer includes MEMA, DEAEMA and AA in a ratio of 55:40:5 to 75:20:5. Such polymers may comprise one or more monomers which include an aryl group, such as styrene (St) and optionally a dialkylacrylamide group (alkyl representing 1 to 4 carbon atoms), such as dimethylacrylamide (DMAA); and diethylacrylamide (DEAA). Preferably the polymers comprise two monomers selected from styrene and a dialkylacrylamide. Preferred polymers comprise, or consist of the following monomers: St:DMAA and St:DEAA and which may be present in the following ratios 40:60 to 95:5, such as 50:50 to 90:10, for example 50:50, 70:30 or 90:10. Additional polymers which may be used in binder formulations may comprise MEA (2-methoxyacrylate) and a dialkylacrylamide group (alkyl representing 1 to 4 carbon atoms), such as dimethylacrylamide (DMAA); and diethylacrylamide (DEAA). Preferred polymers comprise or consist of MEA:DMAA and MEA:DEAA, which may be present in the following ratios 30-80:70-20% respectively, such as 50-70:50-30%. Particularly preferred polymers are MEA(45%):DEAA(55%) and MEA(65%):DMAA(35%).

According to another embodiment of the invention, the binder composition may comprise a polyurethane matrix polymer which provides bond strength and faster curing. Polyurethane polymers may be formed by polymerising a polydiol with a di-isocyanate and optionally with an extender molecule, such as a diol. The extender molecules have the effect of modifying the physical character of the polymers, for example, polymer shape, viscosity and polymer state. The polydiol may be selected from the group consisting of but not limited to, poly(polypropylene glycol)-poly(ethylene glycol) (PPG-PEG), polyethylene glycol (PEG), poly(caprolactone)-diol (PCL-diol), poly(lactic acid)-diol (PLA-diol), poly(glycolic acid)-diol (PGA-diol), poly(tetramethylene glycol) (PTMG) also known as poly(butylene glycol), poly[1,6-hexanediol/neopentyl glycol-alt-(adipic acid)]diol (PHNAD), poly[1,6-hexanediol/neopentyl glycol/diethylene glycol-alt-(adipic acid)]diol (PHNDGAD), poly(dimethyl siloxane)-diol (PDMS). The molecular weight of the polydiol may range from $M_n=200$ to $M_n=7000$ and it may be present in an amount of 15-55% by weight, such as 20-50% by weight of the polymer. The di-isocyanate may be selected from the group consisting of but not limited to methylene diphenyl diisocyanate (MDI), 1,4-phenylene diisocyanate (PDI), 1,1'-methylenebis(4-isocyanatocyclohexane) (HMDI), 2,4-toluene diisocyanate (TDI), hexamethylene diisocyanate (HDI), 1,3-bis(isocynanatomethyl) cyclohexane (BICH). Typically the di-isocyanate is present in an amount of 45-55% by weight of the polymer. Suitable extenders include 1,4-butanediol (BD), ethylene glycol (EG), 2,2,3,3,4,4,5,5-octafluoro-1,6-hexanediol (OFHD); and 3-dimethylamino-1,2-propanediol (DMAPD). When present, the extender may be present in an amount of 10-30 mol % of the polymer, typically 10-25%.

In yet another embodiment, the binder composition may comprise polyesters, copolymers or mixtures (blend) thereof. Non limiting examples of preferred polyesters are: polyglycolide or polyglycolic acid (PGA), polylactic acid (PLA), polycaprolactone (PCL), polyhydroxyalkanoate (PHA), polyhydroxybutyrate (PHB), polyethylene adipate (PEA), polybutylene succinate (PBS), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN), vectran, and/or their copolymers such as PCL-PLA, PCL-PGA, PLA-PGA, etc.

Furthermore, the binder composition of the invention may comprise vinyl polymers. Preferably, these may include polyethylene, polypropylene, polybutadiene, polyvinyl chloride (PVC), polyvinyl acetate (PVAc), polyvinyl alcohol (PVA), polyacrylonitrile (PAN), polyvinyl butyral (PVB), and polyvinyl toluene (PVT). The above said polymers may be incorporated into the binder formulation in homogeneous (aqueous solution) or heterogeneous (emulsion) systems. The solution or emulsion polymers may be present in the composition in an amount ranging from 0.5% up to 50% by weight based on total solids.

In an alternative embodiment, the binder composition of the invention may comprise a compound containing one or more azetidinium groups. Such material is known per se and may be obtained by the reaction of an amino-functional substrate with epichlorohydrin. The azetidinium groups may be a part of a polymer chain comprising one or more non-azetidinium monomer units incorporated into the polymer structure.

The said polymers, more specifically the polymers exemplified above, may show a molecular weight ranging from 500 Daltons (Da) to $2\times10^6$ Da, preferably from $1\times10^3$-$5\times10^5$ Da, more preferably $5\times10^4$ Da-$3\times10^5$ Da.

One or more pre-formed polymers, or monomers, possibly together with initiator, may be emulsion dispersed or solubilised in the binder composition.

It has been shown that such binder compositions produce cured binders showing high bond strength and performance with fast curing rate under usual curing conditions, notably temperatures ranging from 60-280° C., advantageously higher than 80° C., preferably higher than 100° C., and advantageously lower than 250° C., preferably lower than 200° C., preferably 120-180° C. The duration of applying energy for curing purposes is not particularly restricted and may vary from 1 to 240 minutes, preferably less than 200 min, more preferably less than 120 min or even 60 min. Curing durations of up to 40 min, 30 min or 20 min are possible.

In such invention compositions, the polyphenolic macromolecular compound may make from 60 up to 96% by weight based on the total of the three components; the polyamine functional compound may make from 2 up to 20 w % based on the total of the three components; and the matrix polymer content may range from 2 to 20 w % based upon the total of the three components. By way of example, compositions of ammonium or sodium lignosulfonate, HMDA and PVA or sodium carboxymethyl cellulose or hydroxypropyl cellulose advantageously show a weight ratio of 70/15/15.

Another advantage of the curable binder compositions of the invention is that they produce substantially no or only little water upon curing. This is of particular interest as the energy required for manufacturing of a product containing such cured binder may be significantly reduced as energy for evaporation of the water generated during curing is reduced or no longer required. The reduced water generation during curing has a positive impact on the final product with respect to bond strength and swelling properties.

As a result of the above, the binder composition is particularly suitable for use in the production of fiber boards, wood boards, particle boards and similar.

According to an alternative embodiment, the polyamine functional compound comprises chitosan. Chitosan is a linear polysaccharide composed of glucosamine units and bears primary and/or secondary amine functional groups. It is a renewable and/or sustainable class of compounds that may be derived from crustacean shells and shrimps. It has been used in agriculture, notably in seed treatment. Chitosan may show weight average molecular weights ranging from 500 to $2\times10^6$ Daltons.

The ratio between polyphenolic macromolecular compound and chitosan advantageously ranges from 98:2 to 80:20 w %, preferably from 95:5 to 85:15 w % or even to 90:10 w %

In the case of this alternative binder composition, curing may advantageously be effected in aqueous solution, preferably at ambient temperature (notably in the range 10° C. to 25° C.) or slightly elevated temperature. Temperatures below 150° C., 130° C. or even below 100° C., such as at about 80° C. are preferred. Catalysts or surface active agents are not required but may be added in some particular applications. Preferably the pH is maintained at or above 8, preferably at about pH=8.5. Such preferred binder compositions cure with only few or substantially no water formation, which makes them a binder of choice in the production of mineral wool based insulation products and cellulose based boards, such as wood fiber boards or wood particle boards. The energy required for the manufacturing of such products is particularly reduced as curing occurs at low temperature and further as substantially no additional energy is required for water evaporation or drying of the product. The reduced water generation during curing positively affects at least the swelling properties of the product made with the relevant binder composition.

The binder compositions of the invention and binders produced therefrom are essentially formaldehyde-free (that is comprising less than about 1 ppm formaldehyde based on the weight of the composition) and do not liberate substantial formaldehyde. They are preferably formaldehyde-free. Furthermore they are preferably based on natural, hence renewable, resources.

The compositions may further comprise dyes, antifungal agents, antibacterial agents, dedusting oil, hydrophobic agents and other additives, or mixtures thereof, for example in amounts ranging from 0.1 to 15% by weight of binder solids. Silicon-containing coupling agents may be present in such binder, generally in the range from about 0.1 to about 5% by weight based on the weight of the solids in the binder composition. Dedusting oil may be present at up to 10 wt. %.

Without being bound by theory, it is believed that curing generates highly crosslinked high molecular weight polymers. These may be analysed by a sol-gel method, rheology and other known techniques.

The preferred binders generated by curing the aqueous binder compositions of the invention are environmentally friendly as they are based on natural products and essentially free of formaldehyde. In addition, in some embodiments, curing may be effected under reduced temperatures as compared to known binder compositions, which also favourably adds to the environmental related aspects of the binders.

According to the present invention, the term "binder composition" includes any composition comprising a polyphenolic macromolecular compound and a polyamine functional compound which is capable of binding loosely assembled matter, either as such or upon curing.

As used herein, the term "aqueous" means a solution and/or dispersion which comprises water as a solvent. Said term further includes compositions or mixtures which contain water and one or more additional solvents. An "aqueous binder composition" of the invention may be a solution or partial solution of one or more of said binder components or may be a dispersion, such as an emulsion or suspension.

The solid content of the aqueous binder composition may range from 2 to 95 w %, advantageously from 8 to 90 w %, preferably from 10 to 85 w %, based on the weight of the total aqueous binder composition. More specifically, when used as a binder for mineral wool insulation, the solid content of the aqueous binder composition may be in the range from 2 to 25 w %, preferably from 8 to 20 w %, more preferably from 10 to 20 w % or even 12 to 18 w %, based on the weight of the total aqueous binder composition. When used as a binder in wood boards, the solid content of the aqueous binder composition may range from 50 to 95 w %, preferably 50 to 90 w %, more preferably 55 to 85 w % or even 60 to 80 w %, based upon the weight of the total aqueous binder composition.

The components of the binder composition may be transported separately and combined shortly before use in the relevant manufacturing plant. It is also possible to transport the binder composition as such.

The binders of the invention may be used to bond a collection of non or loosely assembled matter. The collection of matter includes any collection of matter which comprises fibers selected from mineral fibers, slag wool fibers, stone wool fibers, glass fibers, aramid fibers, ceramic fibers, metal fibers, carbon fibers, polyimide fibers, polyester fibers, rayon fibers, and cellulosic fibers. Further examples of collection of matter include particulates such as coal, sand, cellulosic fibers, wood shavings, saw dust, wood pulp, ground wood, wood chips, wood strands, wood layers, other natural fibers, such as jute, flax, hemp, straw, wood veneers, facings and other particles, woven or non-woven materials. According to a specific embodiment of the invention, the collection of matter is selected from wood particles and mineral fibers.

In one illustrative embodiment, the binder composition of the invention may be used to make thermal insulation products, comprising mineral fibers. In such an application, the fibers are bonded together such that they become organized in a fiberglass mat which may then be processed into an insulation product. In such an application, the fibers are generally present in an amount ranging from 70 to 99% by total weight of the insulation product, notably from 80 to 99% or from 85 to 99%.

According to another embodiment of the invention, the binder may be used to bond cellulosic particles, such as cellulosic fibers, wood shavings, wood pulp and other materials commonly used to manufacture composite wood boards, including fiber boards, particle boards, oriented strand boards, plywood etc. Such wood boards show nominal thicknesses ranging from 6 to 30 mm and a modulus of Elasticity of at least about 1000 N/mm2, bending strength of at least about 5 N/mm2 and/or an internal bond strength of at least 0.10 N/mm2. In such applications, the binder content in the final wood board may range from about 5 to 30% wt with respect to the total weight of the wood board notably from 9 to 20%. The main components of the aqueous uncured binder composition, that is the polyphenolic macromolecular compound and the polyamine functional compound may be at least partially soluble in water.

The aqueous binder composition may be applied onto the fiber or particular material by spray application. Other possible techniques include roll application or mixing and/or tumbling the collection of matter with the binder composition. As water evaporates the binder composition may form a gel that bonds the particulate material together when arranged into a desirable assembly. When curing, the polyphenolic macromolecular compound and the polyamine functional compound are caused to react to form an essentially water insoluble macromolecular binder. Curing thus imparts increased adhesion, durability and water resistance as compared to uncured binder. Curing may be effected at temperatures between ambient and up to 280° C.

According to another aspect, the invention covers a process for the preparation of an assembly of fibrous materials or particulate materials wherein a combination of (i) an aqueous composition of a polyphenolic macromolecular compound which bears a multitude of phenol or polyhydroxybenzene radicals, such as catechol radicals (dihydroxybenzene), preferably lignosulfonate salts and condensed tannins and mixtures thereof, and (ii) an aqueous composition of a polyamine functional compound comprising primary and/or secondary and/or tertiary and/or quaternary amine functional groups is applied sequentially or simultaneously onto a collection of fibers or particles such that the ratio of polyphenolic macromolecular compound to polyamine functional compound ranges from 98:2 to 70:30 w %, preferably from 95:5 to 80:20 w %, or an aqueous binder composition as defined above is applied onto a collection of fibers or particles, the coated fibers or particles are gathered in an assembly and subjected to curing conditions whereby the polyphenolic macromolecular compound and the polyamine functional compound are caused to react to form a macromolecular binder and water is evaporated. The obtained product may then be further processed in suitable process steps to make intermediate or final products, including but not limited to insulation products or wood boards.

A further polymer may be concomitantly or successively applied onto the collection of fibers or particles, and curing may be performed at a temperature ranging from 100° C.-200° C., preferably higher than 140° C., more preferably lower than 190° C., typically between 160 and 180° C.

As mentioned the polyamine functional compound may be selected from diamines, triamines, tetramines, pentamines and polymeric plolyamines or polyimines. Examples are hexamethylenediamine, diethylenetetramine, diethylenetriamine, polyethyleneimine (PEI), polyvinyl amine, polyether amine, polylysine, ethylene diamine, 1,3-diaminopropane, cadaverine, spermidine, spermine, putrescine, tetraethylmethylenediamine, and triethylenetetramine. As is known to the skilled person, several different types of polyethylenimines are available, such as linear polyethylenimines, branched polyethylenimines and dendrimer type polyethylenimine. Similarly, polyetheramines may show a linear form and branched forms, and all are believed to be suitable for the generation of binder compositions and, hence, binders of the invention.

The ratio of polyphenolic macromolecular compound to polyamine functional compound ranges from 98:2 to 70:30 w %, preferably from 95:5 to 80:20 w %.

Preferably, the ratio of reactive groups on the macromolecules to reactive amino groups in the amine components may be in the range of 10:1 to 1:1.

Preferred binder compositions comprise a lignosulfonate salt, preferably ammonium lignosulfonate or calcium or magnesium lignosulfonate, and a diamine, such as hexamethylenediamine (HMDA).

When the polyamine functional compound is selected from chitosan showing weight average molecular weights ranging from 500 to $2 \times 10^6$ Daltons, curing may be performed at a temperature ranging from ambient to 180° C., preferably less than 160° C., more preferably less than 140° C., even more preferably less than 120° C. or 100° C., under oxidizing and alkaline conditions.

Figure 1:
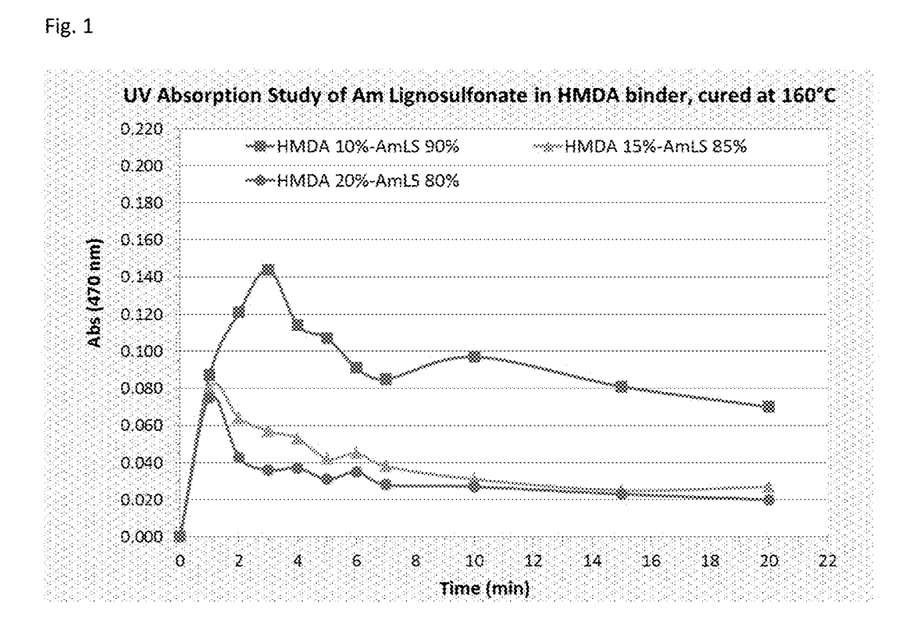
FIG. 1 shows the cure rate at 160° C. for various ammonium-lignosulfonate compositions.
Figure 2:
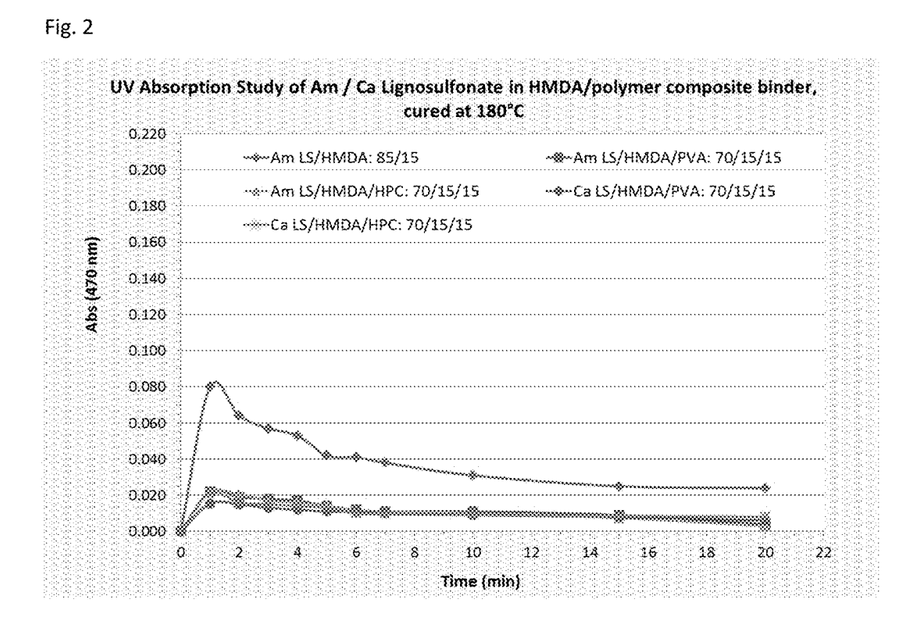
FIG. 2-4 show the cure rate at 180° C., 160° C. and 140° C., respectively, of various binder compositions.
Figure 3:
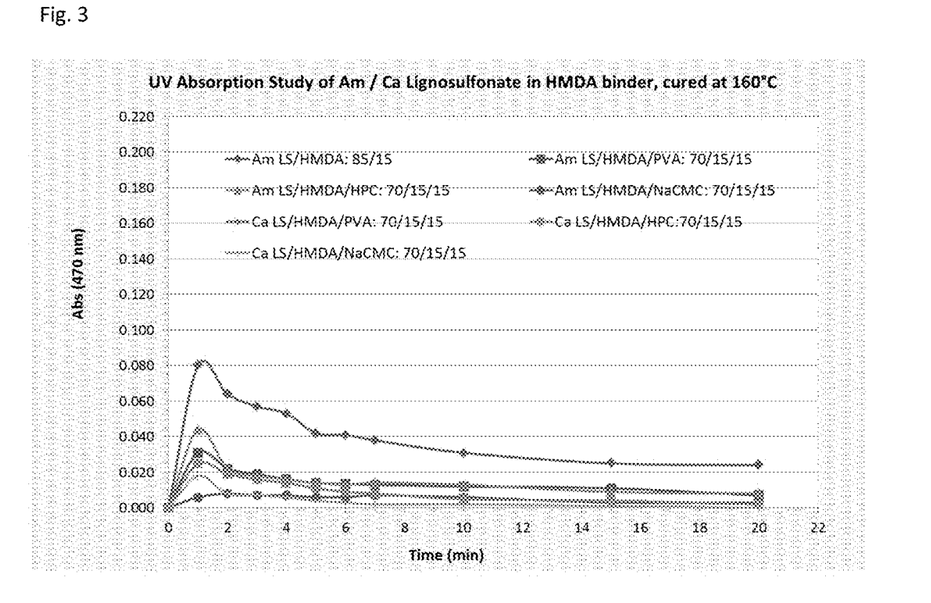
Figure 4:
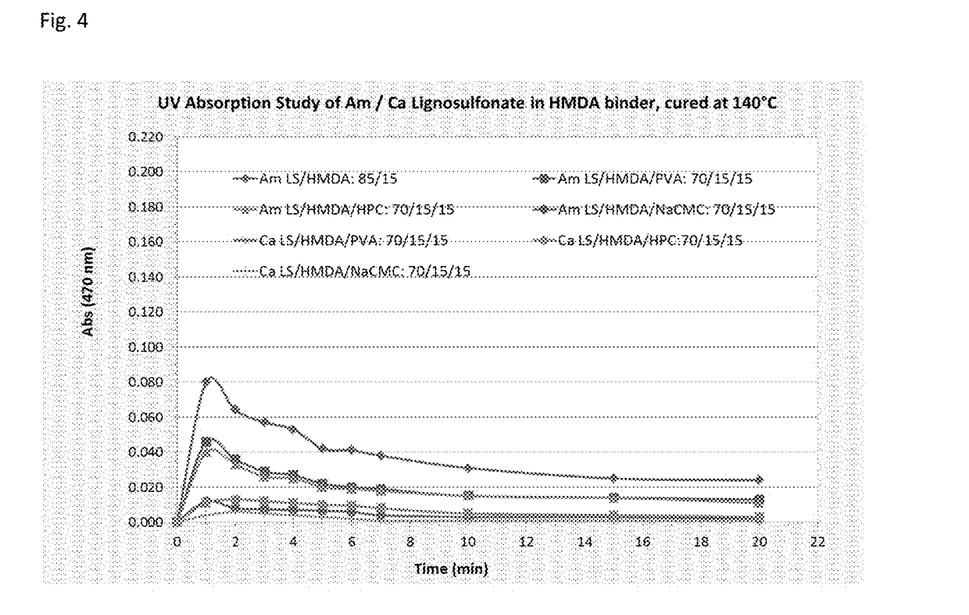
Figure 11:
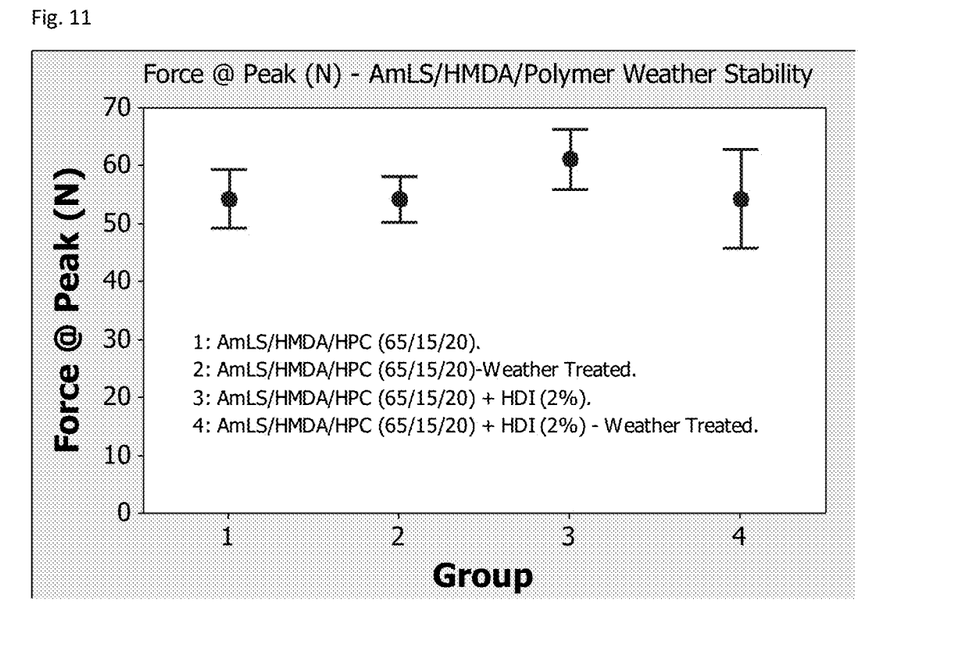
FIG. 11-12 give an indication of weathering stability by comparison of autoclaved and non-autoclaved composite binder compositions.
Figure 12:
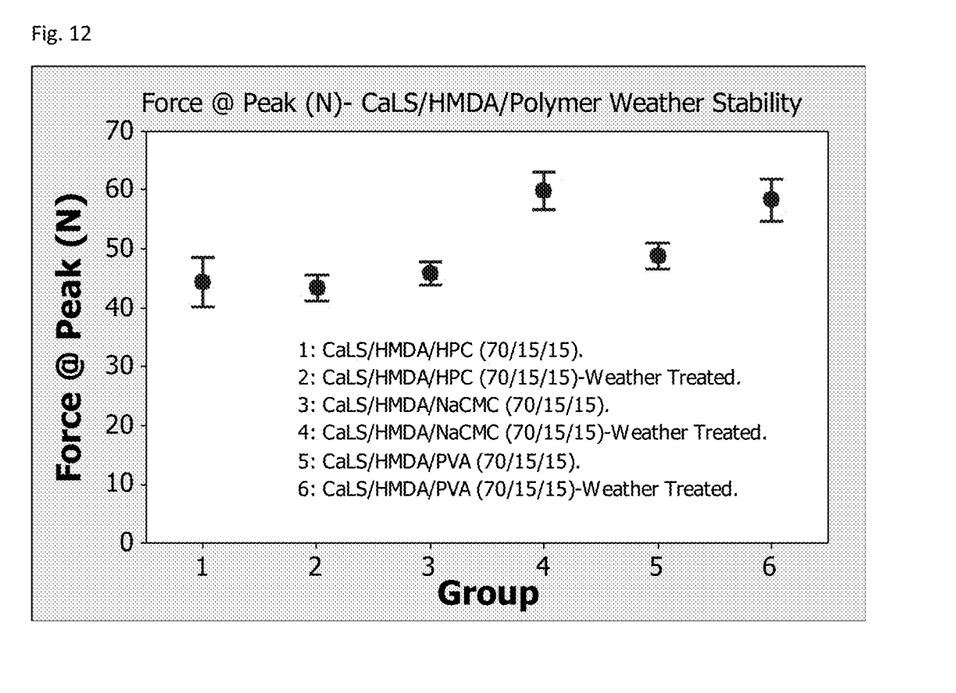

The invention will be explained in more details in the examples below with reference to the attached Figures, in which:

FIG. 1 shows the cure rate at 160° C. for various ammonium-lignosulfonate compositions;

FIG. 2-4 show the cure rate at 180° C., 160° C. and 140° C., respectively, of various binder compositions;

FIG. 5-10 show the mechanical strength of several binder compositions;

FIG. 11-12 give an indication of weathering stability by comparison of autoclaved and non-autoclaved composite binder compositions.

EXAMPLES

Example 1: Preparation of Binder Compositions Comprising Lignosulfonates, Polyamines and Polymer Calcium lignosulfonate (Borrement CA 2120) was provided by Borregaard LignoTech. Sodium lignosulfonate was purchased from Aldrich, and ammonium lignosulfonate was obtained from TemBac.

Sodium carboxymethylcellulose (NaCMC), hydroxypropylcellulose (HPC) and hydroxyethylcellulose (HEC) were obtained from Aldrich and showed a Mw of approx. 250 kDa, 100 kDa and 100 kDa, respectively.

The amine functional material such as hexamethylene diamine (HMDA) and diethylenetriamine (DETA) were obtained from Aldrich. Different types of polyethylenimines (Lupasol® EO, Lupasol® PS, Lupasol® P and Lupasol® G100), polyvinyl amines (Luredur® VM, Luredur® VH and Luredur® VI), were obtained from BASF Chemical Company, and polyetheramines (JeffamineED600, JeffamineEDR148, JeffamineT403) from Huntsman Holland BV.

The required amounts of polymer and lignosulfonate (LS) were dissolved in water individually. The required amount of polyamine functional compound was added to the LS solution followed by homogenization. The polymer solution and LS-amine solution were then combined at ambient temperature and stirred at 500 rpm for 30 minutes.

Example 2: Binder Weight Loss Determination

The 2-5% (solids content) binder solutions were prepared as described above and poured into a petri dish. Weight was determined. The Petri dish was then kept for 2 hours in an oven at 140° C. and weighted again. Weight loss was determined; results are shown in the Table below.

TABLE 1

| Evaluation of binder weight loss, at 140° C. for 2 hours. | |
|---|---|
| Formulations | Binder Weight Loss (%) |
| 70% Am LS + 15% HMDA + 15% PVA | 1.765 |
| 70% Am LS + 15% HMDA + 15% HPC | 2.40 |
| 70% Am LS + 15% HMDA + 15% Na CMC | 2.60 |
| 70% Ca LS + 15% HMDA + 15% PVA | 4.54 |
| 70% Ca LS + 15% HMDA + 15% HPC | 6.533 |
| 70% Ca LS + 15% HMDA + 15% Na CMC | 8.517 |

Example 3: Cure Rate Study

A 50 µl fraction of the binder solution was applied onto a spot of glass microfiber filter (Whatman™) surface. Samples were cured from 1 min up to 20 minutes at different temperatures in an appropriate oven. After curing, each glass filter sample was cut and fully immersed in 50 ml cold water contained in a 150 ml glass beaker, and sonicated for 15 min at room temperature. The extract solution filtered and the absorbance of the extract was measured with a spectrometer at 470 nm. The absorbance was then plotted as a function of cure time.

The cure rate at 160° C. was determined for various compositions comprising ammonium-LS and HMDA (10-20 w %). Results are shown in FIG. 1.

The test was repeated at three different cure temperatures (140° C., 160° C. and 180° C.) for various binder compositions of the invention. Results are shown in FIGS. 2-4. It appears from the results that the three way compositions show a faster curing.

Example 4: Bond Strength Analysis

In order to determine the bond strength of binders, initially impregnated glass veils (non-woven glass fibers) of A4 size were placed into a muffle furnace for 30 minutes at 600° C. in order to ensure burnout of impregnation material and thereafter cooled for 30 min. Approx. 400 g of the prepared binder solutions were poured into separate dip trays and the burnout veils were carefully totally immersed into the relevant binder solutions. The thus impregnated veils were then cured at desired temperatures (e.g. 180° C.) and during relevant periods of time (up to 20 minutes).

The bond strength analysis was performed using a testometric machine (M350-10CT) of the binder impregnated cured veils. For each test a cured binder impregnated A4 veil was cut into 8 equal strips. Each strip was tested separately using a 50 Kg load cell (DBBMTCL-50 kg) with a test speed of 10 mm/min, controlled by winTest Analysis software. Glass veil tensile plates were attached to the testometric machine to ensure a 100 mm gap between plates. The samples were placed vertically in the grippers, within the rubber grip area, and the force tared to zero. Further, onscreen instructions were followed, and generated data reported as herein below. Various parameters such as maximum load at peak, stress at peak and modulus at peak were evaluated by the software, and data presented as an average for 8 samples with standard deviation. The average maximum load at peak/stress at peak is considered as the bond strength.

Figure 5:
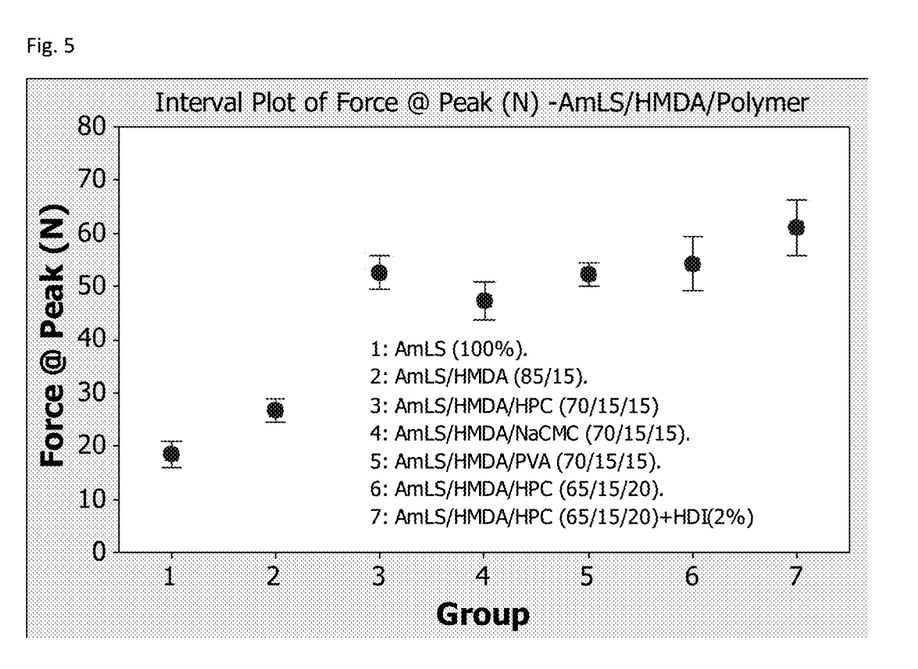
FIG. 5-10 show the mechanical strength of several binder compositions.

The mechanical strengths, force at peak, is presented in FIG. 5 for ammonium-lignosulfonate (AmLS) per se, AmLS/HMDA/HPC (70/15/15), AmLS/HMDA/CMC (70/15/15), AmLS/HMDA/PVA (70/15/15), AmLS/HMDA/HPC (65/15/20) and AmLS/HMDA/HPC (65/15/20) with 2% HDI (hexamethylene diisocyanate oligomer).

Figure 6:
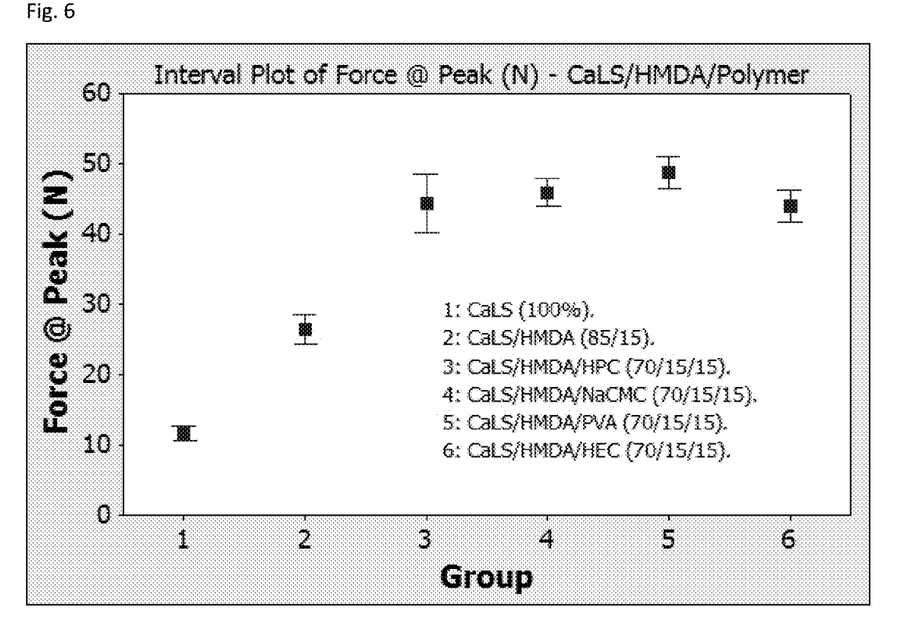

The mechanical strengths, force at peak is presented in FIG. 6 for calcium-lignosulfonate (CaLS) per se, CaLS/HMDA/HPC (70/15/15), CaLS/HMDA/CMC (70/15/15), CaLS/HMDA/PVA (70/15/15) and CaLS/HMDA/HEC (70/15/15).

Figure 7:
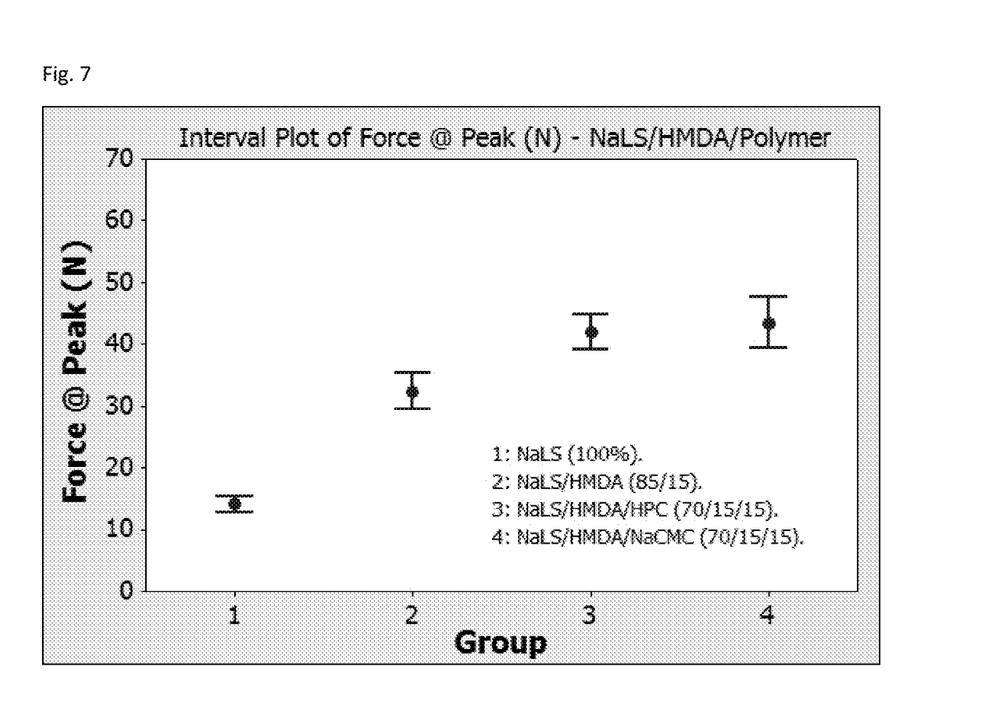
Figure 8:
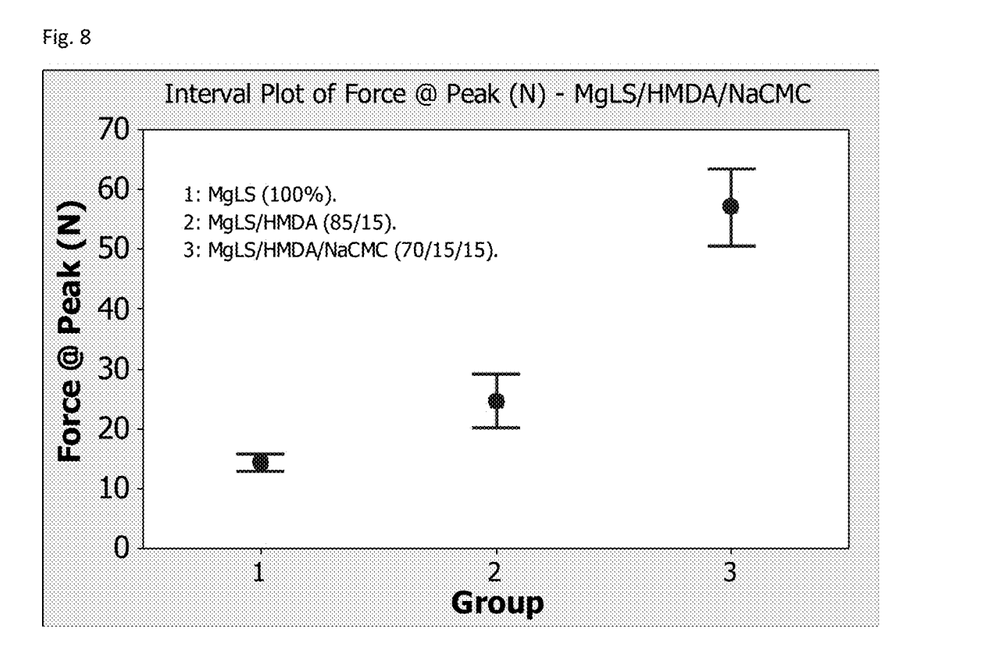

Corresponding data is shown in FIG. 7 for Na-lignosulfonate (NaLS) per se, NaLS/HMDA/HPC (70/15/15) and NaLS/HMDA/CMC (70/15/15); and in FIG. 8 for Magnesium-lignosulfonate (MgLS) per se and MgLS/HMDA/NaCMC (70/15/15).

Figure 9:
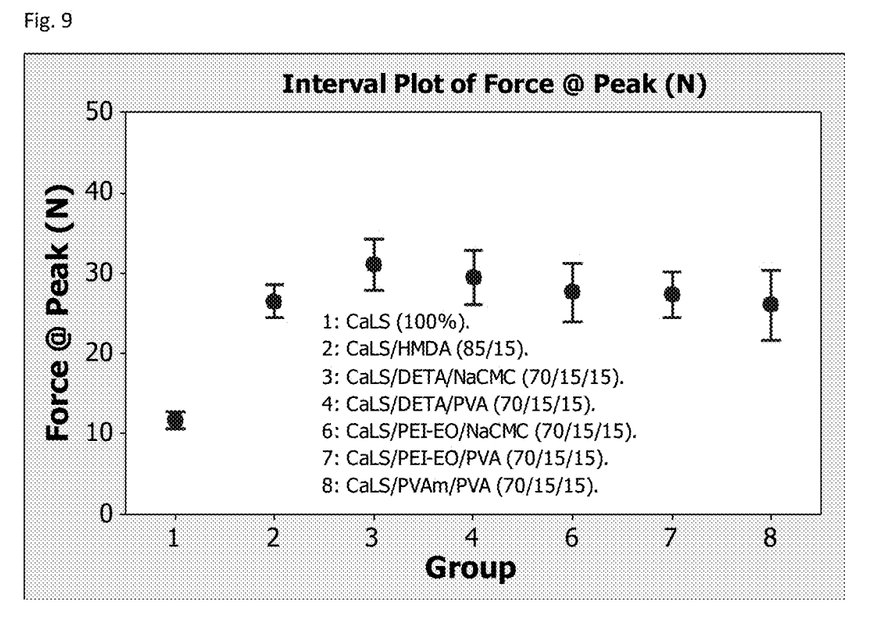

Further data has been generated with CaLS, various polyamines selected from diethylenetriamine, polyethylenimine and polyvinylamine (PVAm), and polymers, more specifically CaLS/DETA/NaCMC (70/15/15), CaLS/DETA/PVA (70/15/15), CaLS/PEI-EO/NaCMC (70/15/15), CaLS/PEI-EO/PVA (70/15/15) and CaLS/PVAm/PVA (70/15/15)—see FIG. 9.

Figure 10:
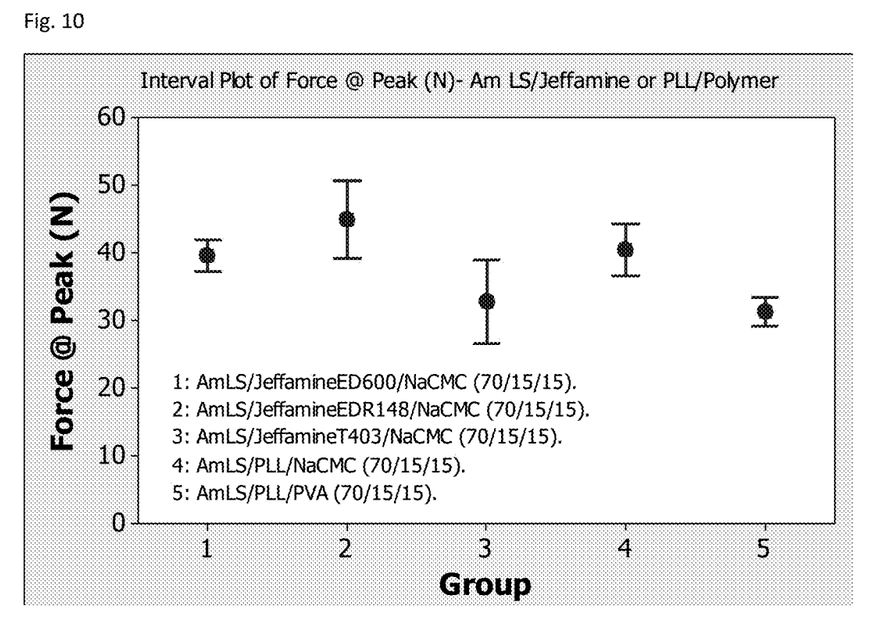

FIG. 10 shows further force at peak data generated for AmLS/JeffamineED600/NaCMC (70/15/15), AmLS/JeffamineEDR148/NaCMC (70/15/15), AmLS/JeffamineT403/NaCMC (70/15/15), AmLS/PLL/NaCMC (70/15/15) and AmLS/PLL/PVA (70/15/15).

Example 5: Weathering Stability

Dry and weathered tensile strength provide an indication of the durability of a glass fiber mat. Binder impregnated cured veils (non-woven glass fibers) were placed in an autoclave (J8341, Vessel: PV02626). The samples were subjected to 90% humidity atmosphere, in a temperature range of from 40° C. to 110° C. (full cycle), under a pressure of up to 2.62 bar for 3 hours. The samples were subsequently dried completely such that no moisture remains on the veil samples. These autoclave treated samples were tested using testometric machine (M350-10CT) for bond strength analysis (see example 4 above), and the results were compared with those from samples that have not been subjected to the humidity treatment (autoclave).

FIG. 11 compares force at peak data for AmLS/HMDA/HPC (65/15/20) before and after sterilization and AmLS/HMDA/HPC (65/15/20)+HDI (2%) before and after autoclave.

FIG. 12 compares force at peak data for CaLS/HMDA/HPC (70/15/15) before and after sterilization, CaLS/HMDA/NaCMC (70/15/15) before and after autoclave and compares force at peak data for AmLS/HMDA/HPC (65/15/20) before and after autoclave and CaLS/HMDA/PVA (70/15/15) before and after autoclave.

No significant loss of mechanical strength has been noticed. Some samples even show increased mechanical strength after autoclave weathering.

Interestingly, the polymerization reaction generates little or no water, thus reducing the energy required for production of the final insulation product.

Example 6: Preparation of a Composite Wood Board

Wood in the form of assorted pine wood shavings was purchased and used as received. The wood was placed in a plastic container and a binder solution prepared in accordance with Example 6, at 80 w % solids (determined as bake out solids after drying at 140° C. for 2 hours), was sprayed onto the wood sample, during which the wood was gently tumbled in order to become uniformly coated. Samples of resinated wood were placed in a collapsible frame and compressed between heatable plates at approx. 2000 kPa, during 25 to 30 minutes, and maintained at about 80° C. The obtained board sample was well-bonded internally, smooth surfaced, mechanically strong and relatively water-resistant in the absence of any hydrophobic or other additive other than the main binder components. Estimated binder content: approx. 13 w %.

The invention claimed is:

1. An aqueous curable binder composition comprising (i) a polyphenolic macromolecular compound which bears a multitude of phenol or polyhydroxybenzene radicals or catechol radicals (dihydroxybenzene), selected from lignosulfonate salts and condensed tannins and mixtures thereof, and (ii) a polyamine functional compound comprising primary and/or secondary and/or tertiary and/or quaternary amine functional groups, wherein the polyamine functional compound is selected from peptides and proteins, in their natural or denatured state, and/or reaction product of (i) and (ii), the ratio of polyphenolic macromolecular compound to polyamine functional compound ranging from 98:2 to 50:50 w %.

2. The aqueous curable binder composition of claim 1, wherein the lignosulfonate salt is selected from calcium lignosulfonate, sodium lignosulfonate, ammonium lignosulfonate, magnesium lignosulfonate, and mixtures thereof.

3. The aqueous curable binder composition of claim 1 further comprising a matrix polymer selected from starch, alginate, hyaluronic acid, and their derivatives, carboxymethyl cellulose (CMC), sodium carboxymethyl cellulose (NaCMC), hydroxypropyl cellulose (HPC), 2-hydroxyethyl cellulose (HEC), oligosaccharides, polyvinyls (PVA, PVAc, PAN), polyacrylics, polyacrylate, polymethacrylate, polyacrylamide, polymethacrylamides, polyurethanes, polyesters, aliphatic isocyanate oligomers, azetidinium containing polymer, chitosan and its derivatives, copolymers thereof and mixtures thereof.

4. The aqueous curable binder composition of claim 3, wherein the polyphenolic macromolecular compound makes from 50 up to 98 w % based on the total of the three components; the polyamine functional compound makes from 1 up to 40 w % based on the total of the three components; and the polymer content ranges from 1 to 20 w % based upon the total of the three components.

5. The aqueous curable binder composition according to claim 1 further comprising dyes, antifungal agents, antibacterial agents, hydrophobes, silicone containing coupling agents, silane, dedust oil, hydrophobic polymers, and/or combinations thereof.

6. An assembly of fibers or particles bonded with an aqueous binder composition according to claim 1 or with a binder resulting from the curing of a binder composition according to claim 1.

7. The assembly of fibers according to claim 6 being an insulation product, wherein the insulation product is a mineral wool mat.

8. The assembly of particles according to claim 6 being a composite wood board, wherein the composite wood board is a wood fiber board, wood particle board, or plywood.

9. A process for the manufacturing an assembly of fibers or particles characterized in that a combination of (i) an aqueous composition of a polyphenolic macromolecular compound which bears a multitude of phenol or polyhydroxybenzene radicals or catechol radicals (dihydroxybenzene), selected from lignosulfonate salts and condensed tannins and mixtures thereof, and (ii) an aqueous composition of a polyamine functional compound comprising primary and/or secondary and/or tertiary and/or quaternary amine functional groups, wherein the polyamine functional compound is selected from peptides and proteins, in their natural or denatured state, is applied sequentially or simultaneously onto a collection of fibers or particles such that the ratio of polyphenolic macromolecular compound to polyamine functional compound ranges from 98:2 to 50:50 w %, or an aqueous binder composition according to claim 1 is applied onto a collection of fibers or particles, in that the coated fibers or particles are gathered in an assembly and subjected to curing conditions whereby the polyphenolic macromolecular compound and the polyamine functional compound are caused to react to form a macromolecular binder and water is evaporated.

10. The process according to claim 9 characterized in that curing is performed at a temperature ranging from 90° C.-200° C.

11. The process according to claim 9, wherein the aqueous binder composition is applied by spraying onto the collection of fibers or particles.

12. The process according to claim 9, wherein the assembly is a wood fiber board or wood particle board, subjected to pressing during curing.

13. The aqueous curable binder composition of claim 1, wherein the ratio of polyphenolic macromolecular compound to polyamine functional compound ranges from 95:5 to 70:30 w %.

14. The aqueous curable binder composition of claim 1, wherein the polyamine functional compound is in the form of a hydrocolloid that is gelatine.

15. The aqueous curable binder composition of claim 1, wherein the polyamine functional compound is polylysine.

16. The process according to claim 9, wherein the polyamine functional compound is polylysine.

\* \* \* \* \*